US012713166B2

(12) United States Patent
Lin et al.

(10) Patent No.: US 12,713,166 B2
(45) Date of Patent: Aug. 18, 2026

(54) VENT ASSEMBLY

(71) Applicant: W. L. Gore & Associates (Shenzhen) Co., Ltd., Shenzhen (CN)

(72) Inventors: Canpeng Lin, Shenzhen (CN); Junping Wu, Shenzhen (CN)

(73) Assignee: W. L. Gore & Associates (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 19/273,702

(22) Filed: Jul. 18, 2025

(65) Prior Publication Data

US 2026/0032369 A1 Jan. 29, 2026

Related U.S. Application Data

(63) Continuation of application No. PCT/CN2024/106342, filed on Jul. 19, 2024.

(30) Foreign Application Priority Data

Jul. 19, 2024 (WO) ................ PCT/CN2024/106342

(51) Int. Cl.
*H04R 1/02* (2006.01)
*H04R 1/08* (2006.01)
*H04R 1/44* (2006.01)

(52) U.S. Cl.
CPC ............... *H04R 1/023* (2013.01); *H04R 1/02* (2013.01); *H04R 1/025* (2013.01); *H04R 1/08* (2013.01); *H04R 1/086* (2013.01); *H04R 1/44* (2013.01); *H04R 2499/11* (2013.01)

(58) Field of Classification Search
CPC .......... H04R 1/02; H04R 1/023; H04R 1/025; H04R 1/08; H04R 1/086; H04R 1/44; H04R 2499/11; H04M 1/03
See application file for complete search history.

(56) References Cited

U.S. PATENT DOCUMENTS 9,253,297 B2 * 2/2016 Abe ........................ H04M 1/03
10,547,925 B2 * 1/2020 Kuki .......................... C08J 7/00
10,911,847 B2 2/2021 Kenaley et al.
2015/0172797 A1 6/2015 Murayama
2019/0310155 A1 * 10/2019 Seo ........................ B32B 27/08
2020/0329289 A1 10/2020 Kenaley et al.
2021/0176550 A1 6/2021 Sugaya et al.

FOREIGN PATENT DOCUMENTS

WO 2023285869 A1 1/2023

* cited by examiner

*Primary Examiner* — Huyen D Le

(57) ABSTRACT

An acoustic vent assembly is provided comprising a nonporous acoustic membrane, and a breathable element, the breathable element defining an aperture and an acoustic pathway extends from a first side of the acoustic vent assembly to a second side of the acoustic vent assembly through the aperture and the nonporous acoustic membrane, the breathable element configured to be positioned between the nonporous acoustic membrane and an acoustic transducer when the acoustic vent assembly is installed in an acoustic device comprising an acoustic transducer.

16 Claims, 5 Drawing Sheets

VENT ASSEMBLY

CROSS-REFERENCE TO RELATED APPLICATIONS

This application is a continuation of International Patent Application No. PCT/CN2024/106342, filed Jul. 19, 2024, which is hereby incorporated herein by reference in its entirety for all purposes.

FIELD

The present disclosure relates to the field of vent assemblies, specifically to the field of acoustic vent assemblies and electronic devices comprising the same.

BACKGROUND

Electronic devices that comprise acoustic transducers such as speakers and microphones often comprise vents or vent assemblies that protect such acoustic transducers from contact with contaminants such as particulates or liquids. Such vents or vent assemblies typically occlude or span an aperture in the housing of the electronic device through which sound travels from or to the speaker or microphone respectively.

The materials used to make up the vents or vent assemblies are required to be resistant to the passage of particulates and liquids, especially liquid water, whilst also maximising the transmission of sound through them.

Typically, in order to ensure that the interior of the electronic device is adequately protected from particulates and liquids, the membrane of the vent or vent assembly is tailored to prevent ingress of particulates and liquids whilst trying to minimise the impact of the membrane on the acoustic properties of the vent assembly.

In addition to this, the vent assembly is required to allow pressure adjacent to the acoustic transducer of the electronic device to be regulated. Vent assemblies that incorporate a porous membrane may allow gas to pass through the porous membrane to thereby allow pressure equalisation through the membrane.

However, a porous membrane may impact the acoustic performance of the vent assembly.

Accordingly, there remains a need for improved vents and vent assemblies that have improved acoustic performance whilst allowing pressure regulation adjacent to the acoustic transducer.

The present disclosure is intended at least in part to address at least one of these issues.

SUMMARY

According to a first aspect there is provided an acoustic vent assembly comprising a nonporous acoustic membrane, and a breathable element, the breathable element defining an aperture and an acoustic pathway extends from a first side of the acoustic vent assembly to a second side of the acoustic vent assembly through the aperture and the nonporous acoustic membrane, the breathable element configured to be positioned between the nonporous acoustic membrane and an acoustic transducer when the acoustic vent assembly is installed in an acoustic device comprising an acoustic transducer, wherein an airflow through the breathable element is at least 5 mL/min at 7 kPa, wherein the breathable element comprises a breathable material and a strengthening element, wherein the strengthening element has a higher z-strength than the breathable material as measured using the test method described herein, the breathable material having an inner surface defining the aperture and an outer surface, the strengthening element being positioned on or directly adjacent to at least a portion of the outer surface of the breathable material such that the strengthening element forms from 20% to 95% of the outer surface of the breathable element.

The breathable element is typically planar and therefore extends in a plane (i.e. the plane of breathable element).

Typically, the strengthening element has a higher z-strength than the breathable material. The "z-strength" of a material as referred to herein is the strength of the material in the direction towards the membrane from the breathable element perpendicular to the plane of the breathable element. The strengthening element may have a significantly higher z-strength than the breathable material as measured using the test method described herein.

The strengthening element accordingly increases the strength of the breathable element in the z-direction. The strengthening element typically comprises a material that has a higher z-strength than the breathable material and the material of the strengthening element should be chosen accordingly. Therefore, the material of the strengthening element is selected to have a greater z-strength than the breathable material to thereby increase the z-strength of the breathable element.

It has been found that vent assemblies comprising a breathable layer that comprises a breathable material having a low z-strength can suffer from delamination of the acoustic vent assembly. For example, the breathable material may sheer or otherwise fail under stress to thereby delaminate or otherwise come away from the membrane.

The provision of a strengthening element may prevent delamination of the breathable element from the nonporous acoustic membrane, or at least increase the resistance of the acoustic vent assembly to delamination.

The strengthening element may have a z-strength of at least 200 N as measured using the method describe herein. The strengthening element may have a z-strength of at least 250 N.

The strengthening element may have a z-strength of at least 300 N. The strengthening element may have a z-strength of at least 350 N. The strengthening element may have a z-strength of at least 400 N. The strengthening element may have a z-strength that is not measurable using the method describe herein.

The strengthening element may have a z-strength of from 200 N to 10 MN. The strengthening element may have a z-strength of from 250 N to 10 MN. The strengthening element may have a z-strength of from 300 N to 10 MN. The strengthening element may have a z-strength of from 350 N to 10 MN. The strengthening element may have a z-strength of from 400 N to 10 MN.

The breathable material may have a z-strength of at least 0.3 N. The breathable material may have a z-strength of at least 0.4 N. The breathable material may have a z-strength of at least 0.5 N. The breathable material may have a z-strength of at least 0.6 N. The breathable material may have a z-strength of at least 0.7 N.

The breathable material may have a z-strength of from 0.3 to 100.0 N. The breathable material may have a z-strength of from 0.4 to 100.0 N. The breathable material may have a z-strength of from 0.5 to 100.0 N. The breathable material may have a z-strength of from 0.6 to 100.0 N. The breathable material may have a z-strength of from 0.7 to 100.0 N. The breathable material may have a z-strength of from 0.3 to 75.0 N. The breathable material may have a z-strength of from 0.3 to 50.0 N.

The breathable element may comprise a first strengthening element and a second strengthening element. The first strengthening element may be positioned on a first side of the breathable material and the second strengthening element may be positioned on a second side of the breathable material. The first side of the breathable material may be positioned on the opposed side of the breathable material to the second side.

The breathable element may comprise one, two, three or more strengthening elements. Accordingly, the breathable element may comprise a plurality of strengthening elements.

The or each strengthening element may have the same or substantially the same depth as the breathable material in the breathable element.

The or each strengthening element may be positioned adjacent to the breathable material. A space may be defined between the strengthening element and the breathable material. In embodiments comprising a first strengthening element and a second strengthening element, a space may be defined between the first strengthening element and the breathable material. A space may be defined between the second strengthening element and the breathable material. A space may be defined between the first strengthening element and the breathable material and a space may be defined between the second strengthening element and the breathable material.

The strengthening element may form from 30% to 95% of the outer surface of the breathable element. The strengthening element may form from 40% to 95% of the outer surface of the breathable element. The strengthening element may form from 50% to 95% of the outer surface of the breathable element. The strengthening element may form from 20% to 90% of the outer surface of the breathable element. The strengthening element may form from 20% to 85% of the outer surface of the breathable element. The strengthening element may form from 20% to 80% of the outer surface of the breathable element. The strengthening element may form from 20% to 75% of the outer surface of the breathable element. The strengthening element may form from 20% to 70% of the outer surface of the breathable element.

For example, the strengthening element may form from 50% to 95% of the outer surface of the breathable element. The strengthening element may form from 50% to 90% of the outer surface of the breathable element.

The strengthening element may form from 50% to 85% of the outer surface of the breathable element. The strengthening element may form from 60% to 85% of the outer surface of the breathable element.

The strengthening element may comprise a polymeric material, a composite material, a textile, a metallic material, or a ceramic material. The polymeric material may be selected from polyamide, polyester such as polyethylene terephthalate (PET), Parylene C, Parylene N, polyphenylene sulfide (PPS) or polyethylene napthalate (PEN), polyolefins such as polyethylene and polypropylene, or polyimide (PI) or fluoropolymers such as polyvinylidene fluoride (PVDF), tetrafluoroethylene-hexafluoropropylene copolymer (FEP), tetrafluoroethylene-(perfluoroalkyl) vinyl ether copolymer (PFE), polytetrafluoroethylene (PTFE), and the like. The textile may be a woven or non-woven textile. The metallic material may comprise stainless steel, titanium, aluminum, copper, or alloy thereof.

The strengthening element may comprise PET or PI.

The strengthening element may comprise a laminate. The laminate may comprise a polymer layer. The laminate may comprise a non-woven or woven textile layer. For example, the laminate may comprise a polymer layer and a non-woven textile layer. Alternatively, the laminate may comprise a polymer layer and a woven-textile layer. The laminate may comprise a plurality of polymer layers.

The strengthening element may be porous. The strengthening element may be nonporous.

The acoustic pathway may extend from an acoustic transducer through the aperture of breathable element and through the nonporous acoustic membrane to the exterior when the acoustic vent assembly is installed in an electronic device.

The airflow through the breathable element may be from 1 to 500 mL/min at 7 kPa. The airflow as described herein is as measured using the method provided below.

The airflow through the breathable element may be from 10 to 500 mL/min at 7 kPa. The airflow through the breathable element may be from 50 to 500 mL/min at 7 kPa. The airflow through the breathable element may be from 100 to 500 mL/min at 7 kPa. The airflow through the breathable element may be from 200 to 500 mL/min at 7 kPa. The airflow through the breathable element may be from 300 to 500 mL/min at 7 kPa. The airflow through the breathable element may be from 1 to 400 mL/min at 7 kPa. The airflow through the breathable element may be from 1 to 300 mL/min at 7 kPa. The airflow through the breathable element may be from 1 to 200 mL/min at 7 kPa.

The provision of the vent assembly of the present aspect may reduce the variability of the airflow through the breathable element when compared to a breathable element that does not comprise a strengthening element.

Without being bound by theory, the strengthening element may make the breathable element more resistant to compression, which may prevent a reduction in airflow through the breathable element due to compression.

Further, the provision of a strengthening element in the breathable element may ensure that it is the strengthening element that determines whether the breathable element delaminates from the nonporous acoustic membrane, rather than the breathable material.

The breathable element may comprise at least one opening defined by the strengthening element such that the breathable material of the breathable element is exposed or extends through at least one opening. During use when the acoustic vent assembly is installed over an aperture defined in the housing of an electronic device, air may flow through the breathable material between the aperture and the outside the acoustic vent assembly through the at least one opening.

In some embodiments, the breathable material extends into the at least one opening. The breathable material may fill or substantially fill the at least one opening. Accordingly, the breathable material may comprise an at least one extended portion that extends into or occupies the at least one opening. The outer surface of the extended portion may form an extension of the outer surface of the strengthening element. Accordingly, the breathable element may have a substantially uniform outer surface. The uniform outer surface may comprise at least one breathable material portion and an at least one strengthening element portion. In embodiments where the breathable element comprises one opening, the strengthening element may form from 70 to 95% of the outer surface of the breathable element.

In embodiments comprising a first strengthening element and a second strengthening element, a first opening may be defined between the first strengthening element and the second strengthening element on a first side of the breathable element and a second opening is defined between the first strengthening element and the second strengthening element on a second side of the breathable element.

The breathable material may comprise a polymer selected from polyethylene (PE), polypropylene (PP), Parylene C, Parylene N, polyphenylene sulfide (PPS), polyethylene napthalate (PEN), polyamide, polyetherketone (PEEK), polysulfones (PSU), (polyethersulfones (PES), polyacrylonitrile (PAN), polyurethane, polyimide (PI), polydimethylsiloxane (PDMS), polyester, or a fluoropolymer such as polyvinylidene fluoride (PVDF), tetrafluoroethylene-hexafluoropropylene copolymer (FEP), tetrafluoroethylene-(perfluoroalkyl) vinyl ether copolymer (PFA), polytetrafluoroethylene (PTFE) and copolymers of the same.

In some embodiments the breathable material comprises PE, PP, PI, polyamide, PSU, PES, PAN, PDMS, Polyurethane, polyester, PVDF, PFA, PTFE, or PEEK.

In some embodiments the breathable material comprises PE, PI or PTFE. The breathable material may comprise PE.

The breathable material may comprise an expanded polymer. For example, the membrane may comprise expanded polyethylene (ePE).

The breathable material may be porous.

The breathable element may comprise a fibrous polymer.

The breathable material may be a laminate of more than one layer of material. The laminate may comprise a polymer layer. The laminate may comprise a non-woven or woven textile layer. For example, the laminate may comprise a polymer layer and a non-woven textile layer. Alternatively, the laminate may comprise a polymer layer and a woven-textile layer. The laminate may comprise a plurality of polymer layers.

The breathable material may comprise a textile. The textile may comprise a woven, non-woven or knitted material. The textile may comprise a polymeric material. The textile may comprise a natural material.

The breathable material may be a particle filled porous composite. The breathable material may comprise particles durably enmeshed within a porous polymer membrane. For example, the porous polymer membrane may comprise a fibrillated polymer and the particles may be durably enmeshed within the fibrils of the fibrillated polymer.

In at least some embodiments the breathable element may be configured to maximise airflow through the breathable element, to minimise the ingress of fluid into and through the breathable element and to minimise the impact of the breathable element on the acoustic performance of the vent assembly.

The breathable element may comprise a coating. The coating may be hydrophobic. Accordingly, the coating may prevent or reduce the ingress of water into or through the breathable layer. The coating may prevent or reduce the ingress of oils into or through the breathable layer.

The breathable material may comprise a polymer foam.

The breathable element may have a thickness of less than 1 mm. The breathable element may have a thickness of less than 0.8 mm. The breathable element may have a thickness of less than 0.6 mm. The breathable element may have a thickness of less than 0.5 mm. The breathable element may have a thickness of less than 0.4 mm. The breathable element may have a thickness of less than 0.3 mm. The breathable element may have a thickness of less than 0.2 mm. The breathable element may have a thickness of less than 0.1 mm. The breathable element may have a thickness of less than 0.05 mm. The breathable element may have a thickness of less than 0.03 mm. The breathable element may have a thickness of less than 0.02 mm. The breathable element may have a thickness of less than 0.01 mm.

The breathable element may have a thickness of from 1 mm to 0.005 mm. The breathable element may have a thickness of from 1 mm to 0.01 mm. The breathable element may have a thickness of from 1 mm to 0.02 mm. The breathable element may have a thickness of from 1 mm to 0.03 mm. The breathable element may have a thickness of from 1 mm to 0.05 mm. The breathable element may have a thickness of from 1 mm to 0.1 mm. The breathable element may have a thickness of from 0.8 mm to 0.005 mm. The breathable element may have a thickness of from 0.6 mm to 0.005 mm. The breathable element may have a thickness of from 0.5 mm to 0.005 mm. The breathable element may have a thickness of from 0.4 mm to 0.005 mm. The breathable element may have a thickness of from 0.3 mm to 0.005 mm. The breathable element may have a thickness of from 0.2 mm to 0.005 mm. The breathable element may have a thickness of from 0.1 mm to 0.005 mm.

Typically, the thickness referred to herein is the thickness of the part in question within the assembled vent assembly in contact with the other components of the vent assembly. Accordingly, the thickness referred to herein may be referred to as the "contact thickness".

The nonporous acoustic membrane may have an airflow of less than 1 mL/min. The nonporous acoustic membrane may have an airflow of less than 0.5 mL/min. The nonporous acoustic membrane may have an airflow of less than 0.25 mL/min. The nonporous acoustic membrane may have an airflow of less than 0.1 mL/min. The nonporous acoustic membrane may have an airflow of less than 0.05 mL/min. The nonporous acoustic membrane may have an airflow of less than 0.01 mL/min. The nonporous acoustic membrane may have an airflow of less than 0.005 mL/min. The nonporous acoustic membrane may have an airflow of less than 0.001 mL/min. The nonporous acoustic membrane may have an airflow that is below detectable levels using the methods described herein.

The nonporous acoustic membrane may comprise silicone, polyurethane, polyethylene, polypropylene, Parylene C, Parylene N, polytetrafluoroethylene, polyether ether ketone (PEEK), polyimide, polyamide or combinations thereof.

The nonporous acoustic membrane may comprise a coating. The nonporous acoustic membrane may comprise a sealing coating. The sealing coating may reduce the air flow through the nonporous acoustic membrane. The sealing coating may seal any pores or holes in the material of the nonporous acoustic membrane. The nonporous acoustic membrane may comprise a protective coating. The protective coating may protect the nonporous acoustic membrane from particulates or liquids.

The nonporous acoustic membrane may have a thickness of less than 100 μm. The nonporous acoustic membrane may have a thickness of less than 80 μm. The nonporous acoustic membrane may have a thickness of less than 60 μm. The nonporous acoustic membrane may have a thickness of less than 50 μm. The nonporous acoustic membrane may have a thickness of less than 40 μm. The nonporous acoustic membrane may have a thickness of less than 30 μm. The nonporous acoustic membrane may have a thickness of less than 20 μm. The nonporous acoustic membrane may have a thickness of less than 10 μm. The nonporous acoustic membrane may have a thickness of from 0.25 μm to 100 μm. The nonporous acoustic membrane may have a thickness of from 0.25 μm to 80 μm. The nonporous acoustic membrane may have a thickness of from 0.25 μm to 60 μm. The nonporous acoustic membrane may have a thickness of from 0.25 μm to 50 μm. The nonporous acoustic membrane may have a thickness of from 0.25 μm to 40 μm. The nonporous acoustic membrane may have a thickness of from 0.25 μm to 30 μm. The nonporous acoustic membrane may have a thickness of from 0.25 μm to 20 μm. The nonporous acoustic membrane may have a thickness of from 0.25 μm to 10 μm.

The nonporous acoustic membrane may have an insertion loss at 3 kHz of less than about 30 dB. The nonporous acoustic membrane may have an insertion loss at 3 kHz of less than about 20 dB. The nonporous acoustic membrane may have an insertion loss at 3 kHz of less than about 10 dB. The nonporous acoustic membrane may have an insertion loss at 3 kHz of less than about 5 dB. The nonporous acoustic membrane may have an insertion loss at 3 KHz of less than about 1 dB. The nonporous acoustic membrane may have an insertion loss at 3 kHz of from about 0.01 dB to about 30 dB. The nonporous acoustic membrane may have an insertion loss at 3 kHz of from about 0.01 dB to about 20 dB. The nonporous acoustic membrane may have an insertion loss at 3 kHz of from about 0.01 dB to about 10 dB. The nonporous acoustic membrane may have an insertion loss at 3 kHz of from about 0.01 dB to about 5 dB. The nonporous acoustic membrane may have an insertion loss at 3 kHz of from about 0.01 dB to about 1 dB.

The acoustic vent assembly may further comprise a vent channel separated from the acoustic pathway by the breathable material of the breathable element that extends from the breathable element through the nonporous acoustic membrane. The vent channel may be configured to allow the transfer of gas between the aperture of the breathable material on a first side of the nonporous acoustic membrane and the second side of the nonporous acoustic membrane. A portion of the vent channel may be defined between the strengthening element and the breathable material. In embodiments where the acoustic vent assembly comprises a first strengthening element and a second strengthening element a portion of the vent channel may be defined between the first strengthening element and the breathable material or between the second strengthening element and the breathable material. Accordingly, a portion of the vent channel may be at least a portion of the space defined between the or a strengthening element and the breathable material.

In some embodiments, the strengthening element comprises a first strengthening element and a second strengthening element and the first strengthening element and the second strengthening element form from 50% to 95% of the outer surface of the breathable element.

In some embodiments, the breathable element comprises a first strengthening element and a second strengthening element and the first strengthening element and the second strengthening element form from 50% to 95% of the outer surface of the breathable element and the first strengthening element is positioned on a first side of the breathable material and the second strengthening element positioned on an opposed second side of the breathable material.

In some embodiments, the breathable element comprises a first strengthening element and a second strengthening element and the first strengthening element and the second strengthening element form from 50% to 95% of the outer surface of the breathable element and the first strengthening element is positioned on a first side of the breathable material and the second strengthening element positioned on an opposed second side of the breathable material, wherein the airflow through the breathable element is from 1 to 500 mL/min at 7 kPa.

In some embodiments, the breathable element comprises a first strengthening element and a second strengthening element and the first strengthening element and the second strengthening element form from 50% to 95% of the outer surface of the breathable element and the first strengthening element is positioned on a first side of the breathable material and the second strengthening element positioned on an opposed second side of the breathable material, wherein a first opening may be defined between the first strengthening element and the second strengthening element on a first side of the breathable element and a second opening is defined between the first strengthening element and the second strengthening element on a second side of the breathable element.

In a second aspect there is provided an acoustic vent assembly comprising a nonporous acoustic membrane, and a breathable element, the breathable element defining an aperture and an acoustic pathway extends from a first side of the acoustic vent assembly to a second side of the acoustic vent assembly through the aperture and the nonporous acoustic membrane, the breathable element configured to be positioned between the nonporous acoustic membrane and an acoustic transducer when the acoustic vent assembly is installed in an acoustic device comprising an acoustic transducer, wherein the vent assembly further comprises a vent channel separated from the acoustic pathway by the breathable material of the breathable element that extends from the breathable element through the nonporous acoustic membrane.

An airflow through the breathable element may be at least 5 mL/min at 7 kPa.

The breathable element may comprise a breathable material and a strengthening element, the breathable material having an inner surface defining the aperture and an outer surface, the strengthening element being positioned on or directly adjacent to at least a portion of the outer surface of the breathable material such that the strengthening element surrounds the breathable material. Accordingly, the strengthening element may form the outer surface of the breathable element.

The vent channel may be configured to allow the transfer of gas between the aperture of the breathable material on a first side of the nonporous acoustic membrane and the second side of the nonporous acoustic membrane. A portion of the vent channel may be defined between the strengthening element and the breathable material. In embodiments where the acoustic vent assembly comprises a first strengthening element and a second strengthening element a portion of the vent channel may be defined between the first strengthening element and the breathable material or between the second strengthening element and the breathable material. Accordingly, a portion of the vent channel may be at least a portion of the space defined between the or a strengthening element and the breathable material.

It has been found that the provision of a vent channel in the vent assembly improves the airflow through the acoustic vent assembly without adversely impacting the stability of the acoustic vent assembly.

The nonporous acoustic membrane may define a membrane aperture and the vent channel may extend through the membrane aperture. The nonporous acoustic membrane may define a membrane aperture and the membrane aperture may define a portion of the vent channel.

The features of the nonporous acoustic membrane and breathable element of the second aspect are as described in the first aspect.

The breathable element is typically planar and therefore extends in a plane (i.e. the plane of breathable element).

Typically, the strengthening element has a higher z-strength than the breathable material. The "z-strength" of a material as referred to herein is the strength of the material in the direction towards the membrane from the breathable element perpendicular to the plane of the breathable element. The strengthening element may have a significantly higher z-strength than the breathable material as measured using the test method described herein.

The strengthening element accordingly increases the strength of the breathable element in the z-direction. The strengthening element typically comprises a material that has a higher z-strength than the breathable material and the material of the strengthening element should be chosen accordingly. Therefore, the material of the strengthening element is selected to have a greater z-strength than the breathable material to thereby increase the z-strength of the breathable element.

It has been found that vent assemblies comprising a breathable layer that comprises a breathable material having a low z-strength can suffer from delamination of the vent assembly.

For example, the breathable material may sheer or otherwise fail under stress to thereby delaminate from the membrane.

The provision of a strengthening element may prevent delamination of the breathable element from the nonporous acoustic membrane, or at least increase the resistance of the vent assembly to delamination.

The strengthening element may have a z-strength of at least 200 N as measured using the method describe herein. The strengthening element may have a z-strength of at least 250 N.

The strengthening element may have a z-strength of at least 300 N. The strengthening element may have a z-strength of at least 350 N. The strengthening element may have a z-strength of at least 400 N. The strengthening element may have a z-strength that is not measurable using the method describe herein.

The strengthening element may have a z-strength of from 200 N to 10 MN. The strengthening element may have a z-strength of from 250 N to 10 MN. The strengthening element may have a z-strength of from 300 N to 10 MN. The strengthening element may have a z-strength of from 350 N to 10 MN. The strengthening element may have a z-strength of from 400 N to 10 MN.

The breathable material may have a z-strength of at least 0.3 N. The breathable material may have a z-strength of at least 0.4 N. The breathable material may have a z-strength of at least 0.5 N. The breathable material may have a z-strength of at least 0.6 N. The breathable material may have a z-strength of at least 0.7 N.

The breathable material may have a z-strength of from 0.3 to 100.0 N. The breathable material may have a z-strength of from 0.4 to 100.0 N. The breathable material may have a z-strength of from 0.5 to 100.0 N. The breathable material may have a z-strength of from 0.6 to 100.0 N. The breathable material may have a z-strength of from 0.7 to 100.0 N. The breathable material may have a z-strength of from 0.3 to 75.0 N. The breathable material may have a z-strength of from 0.3 to 50.0 N.

The strengthening element may have the same or substantially the same depth as the breathable material in the breathable element.

The strengthening element may be positioned adjacent to the breathable material. A space may be defined between the strengthening element and the breathable material. In embodiments comprising a first strengthening element and a second strengthening element, a space may be defined between the first strengthening element and the breathable material. A space may be defined between the second strengthening element and the breathable material. A space may be defined between the first strengthening element and the breathable material and a space may be defined between the second strengthening element and the breathable material.

The strengthening element may comprise a polymeric material, a composite material, a textile, a metallic material, or a ceramic material. The polymeric material may be selected from polyamide, polyester such as polyethylene terephthalate (PET), Parylene C, Parylene N, polyphenylene sulfide (PPS) or polyethylene napthalate (PEN), polyolefins such as polyethylene and polypropylene, or polyimide (PI) or fluoropolymers such as polyvinylidene fluoride (PVDF), tetrafluoroethylene-hexafluoropropylene copolymer (FEP), tetrafluoroethylene-(perfluoroalkyl) vinyl ether copolymer (PFE), polytetrafluoroethylene (PTFE), and the like. The textile may be a woven or non-woven textile. The metallic material may comprise stainless steel, titanium, aluminum, copper, or alloy thereof.

The strengthening element may comprise PET or PI.

The strengthening element may comprise a laminate. The laminate may comprise a polymer layer. The laminate may comprise a non-woven or woven textile layer. For example, the laminate may comprise a polymer layer and a non-woven textile layer. Alternatively, the laminate may comprise a polymer layer and a woven-textile layer. The laminate may comprise a plurality of polymer layers.

The strengthening element may be porous. The strengthening element may be nonporous.

The acoustic pathway may extend from an acoustic transducer through the aperture of breathable element and through the nonporous acoustic membrane to the exterior when the acoustic vent assembly is installed in an electronic device.

The airflow through the breathable element may be from 1 to 500 mL/min at 7 kPa. The airflow as described herein is as measured using the method provided below.

The airflow through the breathable element may be from 10 to 500 mL/min at 7 kPa. The airflow through the breathable element may be from 50 to 500 mL/min at 7 kPa. The airflow through the breathable element may be from 100 to 500 mL/min at 7 kPa. The airflow through the breathable element may be from 200 to 500 mL/min at 7 kPa. The airflow through the breathable element may be from 300 to 500 mL/min at 7 kPa. The airflow through the breathable element may be from 1 to 400 mL/min at 7 kPa. The airflow through the breathable element may be from 1 to 300 mL/min at 7 kPa. The airflow through the breathable element may be from 1 to 200 mL/min at 7 kPa.

The provision of the vent assembly of the present aspect may reduce the variability of the airflow through the breathable element when compared to a breathable element that does not comprise a strengthening element.

Without being bound by theory, the strengthening element may make the breathable element more resistant to compression, which may prevent a reduction in airflow through the breathable element due to compression.

Further, the provision of a strengthening element in the breathable element may ensure that it is the strengthening element that determines whether the breathable element delaminates from the nonporous acoustic membrane, rather than the breathable material.

The breathable material may comprise a polymer selected from polyethylene (PE), polypropylene (PP), Parylene C, Parylene N, polyphenylene sulfide (PPS), polyethylene napthalate (PEN), polyamide, polyetherketone (PEEK), polysulfones (PES), polyacrylonitrile (PAN), polyurethane, polyimide (PI), polydimethylsiloxane (PDMS), polyester, or a fluoropolymer such as polyvinylidene fluoride (PVDF), tetrafluoroethylene-hexafluoropropylene copolymer (FEP), tetrafluoroethylene-(perfluoroalkyl) vinyl ether copolymer (PFA), polytetrafluoroethylene (PTFE) and copolymers of the same.

In some embodiments the breathable material comprises PE, PP, PI, polyamide, PSU, PES, PAN, PDMS, Polyurethane, polyester, PVDF, PFA, PTFE, or PEEK.

In some embodiments the breathable material comprises PE, PI or PTFE.

The breathable material may comprise an expanded polymer. For example, the membrane may comprise expanded polyethylene (ePE).

The breathable material may be a laminate of more than one layer of material. The laminate may comprise a polymer layer. The laminate may comprise a non-woven or woven textile layer. For example, the laminate may comprise a polymer layer and a non-woven textile layer.

Alternatively, the laminate may comprise a polymer layer and a woven-textile layer. The laminate may comprise a plurality of polymer layers.

The breathable material may comprise a fibrous polymer.

The breathable material may comprise a textile. The textile may comprise a woven, non-woven or knitted material. The textile may comprise a polymeric material. The textile may comprise a natural material.

In at least some embodiments the breathable element may be configured to maximise airflow through the breathable element, to minimise the ingress of fluid into and through the breathable element and to minimise the impact of the breathable element on the acoustic performance of the vent assembly.

The breathable element may comprise a coating. The coating may be hydrophobic. Accordingly, the coating may prevent or reduce the ingress of water into or through the breathable layer. The coating may prevent or reduce the ingress of oils into or through the breathable layer.

The breathable material may comprise a polymer foam.

The breathable element may have a thickness of less than 1 mm. The breathable element may have a thickness of less than 0.8 mm. The breathable element may have a thickness of less than 0.6 mm. The breathable element may have a thickness of less than 0.5 mm. The breathable element may have a thickness of less than 0.4 mm. The breathable element may have a thickness of less than 0.3 mm. The breathable element may have a thickness of less than 0.2 mm. The breathable element may have a thickness of less than 0.1 mm. The breathable element may have a thickness of less than 0.05 mm. The breathable element may have a thickness of less than 0.03 mm. The breathable element may have a thickness of less than 0.02 mm. The breathable element may have a thickness of less than 0.01 mm.

The breathable element may have a thickness of from 1 mm to 0.005 mm. The breathable element may have a thickness of from 1 mm to 0.01 mm. The breathable element may have a thickness of from 1 mm to 0.02 mm. The breathable element may have a thickness of from 1 mm to 0.03 mm. The breathable element may have a thickness of from 1 mm to 0.05 mm. The breathable element may have a thickness of from 1 mm to 0.1 mm. The breathable element may have a thickness of from 0.8 mm to 0.005 mm. The breathable element may have a thickness of from 0.6 mm to 0.005 mm. The breathable element may have a thickness of from 0.5 mm to 0.005 mm. The breathable element may have a thickness of from 0.4 mm to 0.005 mm. The breathable element may have a thickness of from 0.3 mm to 0.005 mm. The breathable element may have a thickness of from 0.2 mm to 0.005 mm. The breathable element may have a thickness of from 0.1 mm to 0.005 mm.

The nonporous acoustic membrane may have an airflow of less than 1 mL/min. The nonporous acoustic membrane may have an airflow of less than 0.5 mL/min. The nonporous acoustic membrane may have an airflow of less than 0.25 mL/min. The nonporous acoustic membrane may have an airflow of less than 0.1 mL/min. The nonporous acoustic membrane may have an airflow of less than 0.05 mL/min. The nonporous acoustic membrane may have an airflow of less than 0.01 mL/min. The nonporous acoustic membrane may have an airflow of less than 0.005 mL/min. The nonporous acoustic membrane may have an airflow of less than 0.001 mL/min. The nonporous acoustic membrane may have an airflow that is below detectable levels using the methods described herein. It will be appreciated that the airflow of the nonporous acoustic membrane is the airflow through the nonporous acoustic membrane excluding the vent channel.

The nonporous acoustic membrane may comprise silicone, polyurethane, polyethylene, polypropylene, Parylene C, Parylene N, polytetrafluoroethylene, polyether ether ketone (PEEK), polyimide, polyamide or combinations thereof.

The nonporous acoustic membrane may comprise a coating. The nonporous acoustic membrane may comprise a sealing coating. The sealing coating may reduce the air flow through the nonporous acoustic membrane. The sealing coating may seal any pores or holes in the material of the nonporous acoustic membrane. The nonporous acoustic membrane may comprise a protective coating. The protective coating may protect the nonporous acoustic membrane from particulates or liquids.

The nonporous acoustic membrane may have a thickness of less than 100 μm. The nonporous acoustic membrane may have a thickness of less than 80 μm. The nonporous acoustic membrane may have a thickness of less than 60 μm. The nonporous acoustic membrane may have a thickness of less than 50 μm. The nonporous acoustic membrane may have a thickness of less than 40 μm. The nonporous acoustic membrane may have a thickness of less than 30 μm. The nonporous acoustic membrane may have a thickness of less than 20 μm. The nonporous acoustic membrane may have a thickness of less than 10 μm. The nonporous acoustic membrane may have a thickness of from 0.25 μm to 100 μm.

The nonporous acoustic membrane may have a thickness of from 0.25 μm to 80 μm. The nonporous acoustic membrane may have a thickness of from 0.25 μm to 60 μm. The nonporous acoustic membrane may have a thickness of from 0.25 μm to 50 μm. The nonporous acoustic membrane may have a thickness of from 0.25 μm to 40 μm. The nonporous acoustic membrane may have a thickness of from 0.25 μm to 30 μm. The nonporous acoustic membrane may have a thickness of from 0.25 μm to 20 μm. The nonporous acoustic membrane may have a thickness of from 0.25 μm to 10 μm.

The nonporous acoustic membrane may have an insertion loss at 3 kHz of less than about 30 dB. The nonporous acoustic membrane may have an insertion loss at 3 kHz of less than about 20 dB. The nonporous acoustic membrane may have an insertion loss at 3 kHz of less than about 10 dB. The nonporous acoustic membrane may have an insertion loss at 3 kHz of less than about 5 dB. The nonporous acoustic membrane may have an insertion loss at 3 kHz of less than about 1 dB. The nonporous acoustic membrane may have an insertion loss at 3 kHz of from about 0.01 dB to about 30 dB. The nonporous acoustic membrane may have an insertion loss at 3 kHz of from about 0.01 dB to about 20 dB. The nonporous acoustic membrane may have an insertion loss at 3 kHz of from about 0.01 dB to about 10 dB. The nonporous acoustic membrane may have an insertion loss at 3 kHz of from about 0.01 dB to about 5 dB. The nonporous acoustic membrane may have an insertion loss at 3 kHz of from about 0.01 dB to about 1 dB.

According to a third aspect there is provide an acoustic device comprising a housing defining an acoustic aperture and an enclosed internal volume, an acoustic substrate comprising an acoustic transducer and an acoustic vent assembly according to the first aspect or the second aspect spanning the acoustic aperture, wherein an acoustic volume is defined between the nonpermeable acoustic membrane and the acoustic transducer and the acoustic pathway of the acoustic vent assembly extending from the acoustic transducer to the acoustic aperture through the nonpermeable acoustic membrane, wherein the breathable element of the acoustic vent assembly is configured to allow pressure equilibration between acoustic volume and the enclosed internal volume of the housing.

The acoustic transducer may be a microphone or speaker.

The acoustic substrate may comprise a circuit board. The acoustic substrate may comprise a first acoustic transducer and a second acoustic transducer. The first acoustic transducer and/or the second acoustic transducer may be a microphone. The first acoustic transducer and/or the second acoustic transducer may be a speaker. The first acoustic transducer may be a speaker and the second acoustic transducer may be a microphone.

The enclosed internal volume may be sealed from the external environment. The acoustic device may comprise a vent aperture and the gas may be able to be transferred between the enclosed internal volume and the external environment via the vent aperture.

The acoustic vent assembly may be enclosed from the interior of the electronic device. The electronic device may comprise an enclosure. The enclosure may comprise a wall. The enclosure may comprise the substrate.

BRIEF DESCRIPTION OF THE FIGURES

Embodiments of the present invention will now be described, by way of non-limiting example, with reference to the accompanying drawings.

DETAILED DESCRIPTION

Figure 1:
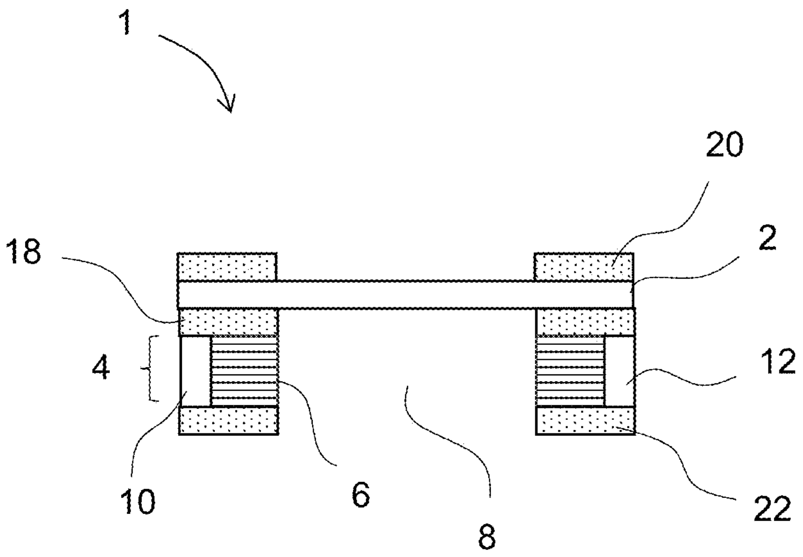
FIG. 1: A side view of a vent assembly according to an embodiment.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as “a”, “an” and “the” are not intended to refer to only a singular entity, but include the general class of which a specific example may be used for illustration. The terminology herein is used to describe specific embodiments of the invention, but their usage does not delimit the invention, except as outlined in the claims.

Test Methods

Pressure Equilibration Test

Microphone cavity pressure equilibration is a test method for measuring the time it takes to equilibrate a pressure difference built up between a simulated acoustic cavity and the environment. A pressure vessel is pressurized through the pressure inlet and contains two Freescale Semiconductor MPX4250A pressure transducers. The simulated acoustic cavity (microphone cavity) is created at the interface of the acoustic vent assembly and a pressure transducer, the pressure equalizing assembly comprising a non-porous membrane and a breathable layer. The acoustic vent assembly is attached to the pressure transducer at ambient pressure before being put in the pressure vessel. The pressure transducer with the attached acoustic vent assembly measures the pressure in the simulated microphone cavity while the other pressure transducer measures the pressure of the environment in the pressure vessel. The pressure vessel is pressurized to 27.6 kPa (4 psi) using compressed air and a regulator. The pressures measured by the pressure transducers are recorded until the pressures are equal or until a pre-defined amount of time has passed. The data for pressure differential over time between the two transducers can then be described by parameters such as the exponential decay time constant, $\tau$, which can be used as a measure of material performance. $3\tau$ corresponds to time for 95% of initial pressure to be equilibrated. A higher $\tau$ corresponds to slower equilibration and lower breathability.

ATEQ Airflow Test

ATEQ Airflow is a test method for measuring laminar volumetric flow rates of air through acoustic vent assembly samples. The sample assembly (fixture and sample placement) used in the Insertion Loss Test provided above is also used for the ATEQ Airflow test, except the part is reversed so that the breathability layer faces the opening in the steel plate instead of the acoustic device. The sample assembly is clamped between two plates in a manner that only compression to the steel plate and seals against the top surface of the steel plate using an O-ring. An ATEQ Premier D Compact Flow Tester is used to measure airflow rate (mL/min) through the acoustic cover by challenging it with 7 kPa of air pressure through the orifice in the steel plate.

Porosity Measurement

Samples were die cut to form circular sections of 5.64 cm radius (area=100 $cm^2$). Each sample was weighed using a Mettler Toledo Analytical balance. Using the thickness calculated by the KEYENCE laser (see explanation below), the bulk density of the samples was calculated as discussed previously.

The skeletal density is the density of a solid calculated by excluding all open pores, but including internal (or blind) pore volume. The density of polyethylene was assumed to be:

$$\rho\,(\text{polymer}) = 0.94\ \text{g/cc}.$$

Thus, the membrane porosity or total porosity within the substrate is simply the void volume of the sample divided by the total volume of the sample. The membrane porosity can be calculated by the following formula:

$$\%\ \text{Porosity} = 100\% * \{1 - \rho\,(\text{bulk})/\rho\,(\text{skeleton})\}$$

Contact Thickness

The contact thickness of the membranes was measured using a Mitutoyo Litematic VL-50S motorized height gage (commercially available from Mitutoyo Corporation, Kawasaki, Japan). The measurement is made by gently placing the sample membrane on a polished flat granite block and lowering the contact probe to apply a 1 gram force. The average of the twelve measurements was utilized to provide a mean contact thickness. Contact thickness is an appropriate technique for measuring the thickness of for polyethylene membranes which are opaque and are therefore unsuitable for the measurement of non-contact thickness.

Peel Strength Test

Vent Assembly Level

A sample acoustic vent assembly is placed on a support plate (SUS304) having a sufficiently rough surface finish to maximise bonding and pressed down to confirm adhesion. A circle of pressure sensitive adhesive (PSA) (Teraoka 7641M with an outer diameter of 4.2 mm, obtained from Teraoka) is placed onto the side of the sample opposed to the support plate. A strip of PET is placed on the PSA with a 2 mm over hang on one side of the sample. A force of 2.5 N is applied to the PET strip for 15 seconds to compress the sample between the PET strip and support plate.

The support plate is clamped horizontally and the free end of the PET strip is clamped such that the PET strip extends 70 mm vertically above the sample. The clamped PET strip is moved vertically at 600 mm/min and the resistance force is measured and the maximum measured force is recorded in Newtons.

Material Level

The cohesive strength of the material was measured under ambient conditions using a TAPPI-541 (Zwick, Germany) device. A 75 mm×130 mm piece of two-sided adhesive tape, such as 9500PC (3M Corporation), was attached to similar sized face of the bottom platen. A sample of the composite or of the material, with its machine direction oriented in the long direction of the platen, was placed over the tape covered bottom platen. The membrane in between each of the five 25.4 mm×25.4 mm test areas was slit with a scalpel to isolate the test samples. The upper platen, which has identical five 25.4 mm×25.4 mm test areas, was covered with the same two sided adhesive tape. The upper & bottom platens were mounted in an Instron tensile testing machine with the two platens aligned at a 90 degree angle to each other. The platens with the sample in between were compressed together ("Load Strength") to 756.19 N ("ZWICK 170"), or 3.16 kN ("ZWICK 710") at a rate of 12.7 mm/min and held under that force for 30 seconds. The compressive force was then reduced to zero at a rate of 12.0 kN/min. After 7.5 seconds of force removal, the platens were separated at the rate of 50.8 mm/min and the maximum force, in Newtons, to separate the platen was recorded. If the failure is cohesive in nature, the failed sample would be covering the surfaces of both the platens. If the cohesive strength of the sample is greater than the adhesive strength of the tape to the platens or of the tape to the sample, both the platens will not be covered with failed portion of both the samples. Samples in each of the 5 test areas were measured as above and $F_{avg}$, the average of five maximum force values, is calculated.

The Z-strength of the sample in MPa=($F_{avg}$ in Newton)/(645.16 $mm^2$).

TABLE 1

Z-strength of materials used for the examples below

| Material | Source | z-strength as measured (MPa) | Load strength used |
|---|---|---|---|
| EPTFE (porous) | Made using the method provided below | 0.04 | ZWICK 170 |
| EPE (porous) | Made using the method provided below | 0.29 | ZWICK 170 |
| PI (nonporous) | CEN New Materials Co., Ltd. (BY222) | 1.77* | ZWICK 710 |
| PET (nonporous) | Toray Advanced Composites UK (T60-toray PET #50) | 1.75* | ZWICK 710 |

*adhesive failed, not material.

Delamination Test

Four samples (With low tack pull tab) acoustic vent assembly is placed on a support plate (SUS304) having a sufficiently rough surface finish to maximize bonding and pressed down to confirm adhesion. A single-sided adhesive tape is placed on the samples with a 5 mm over hang on one side of the sample. The samples are pressed slightly with a finger. The support plate is clamped horizontally and a length of 15 mm of the free end of the single-sided adhesive tape is adhered to an acrylic plate, which is then clamped such that the top of the acrylic plate extends 70 mm vertically above the support plate. The clamped single-sided adhesive tape is moved vertically at 600 mm/min away from the support plate. After the test, the sample was reviewed to determine whether the sample had undergone delamination (fail at the breathable layer) or not (normally separate from the pull tab and finish good).

Matrix Tensile Strength (MTS)

To determine the matrix tensile strength (MTS), a sample polyethylene membrane was cut in the longitudinal and transverse directions using either an ASTM D638 Type V Die (D638) or an ASTM D412 Type F Die (D412F). Tensile load as a function of displacement was measured using an INSTRON® 5565 (Illinois Tool Works Inc., Norwood, MA) tensile test machine equipped with flat-faced grips and a 100 N load cell. The grip separation distance for ASTM D638V tests was set to 3.18 cm and using an ASTM defined gage length of 0.76 cm, a strain rate of 0.127 cm/s or 16.7%/s was used. The grip separation distance for ASTM D412F tests was set to 8.26 cm and using an ASTM defined gage length of 5.89 cm, a strain rate of 0.847 cm/s or 14.4%/s was used. After placing the sample in the grips, the sample was retracted 1.27 cm to obtain a baseline followed by a tensile test at the aforementioned strain rate. Three samples for each condition were tested individually samples in each orthogonal (e.g., longitudinal (machine) and transverse) direction and their respective averages were reported.

The ultimate tensile strength was measured by the Instron load cell and is defined as the maximum load reached during each test run divided by the cross-section area at the center of the die cut dogbone. Data was exported into a data analysis program. Three samples in each orthogonal (e.g. longitudinal and transverse) direction were tested and their respective averages were reported. The larger of the two average maximum tensile moduli determined for the two orthogonal directions was assigned that of the first direction. The smaller of the two average maximum tensile moduli determined for the two orthogonal directions was assigned that of the second direction.

The matrix tensile strength (MTS) is used to communicate the tensile strength of a polymer making up a porous or non-porous article and is calculated using the following formula:

$$MTS = TS * \rho_{polymer}/\rho_{bulk}.$$

where $TS$ = ultimate tensile strength from the uniaxial tensile testing;

$\rho_{bulk}$ = sample bilk density;

$\rho_{polymer}$ = theoretical skeletal density of $PE$, taken as 0.94 g/cm$^3$.

Materials

Expanded Polyethylene (ePE) Porous Membrane

A starting ultrahigh molecular weight (UHMW) polyethylene resin having a weighted average molecular weight of 1,400,000 g/mol, was used in a gel method to manufacture a precursor film as a tape in accordance with the method disclosed in U.S. Pat. No. 8,645,565, the teaching of which is incorporated herein in its entirety, to provide a gel-processed UHMWPE membrane and available as Solupor® from W. L. Gore & Associates, Inc. The resulting gel-processed UHMWPE membrane, Solupor®, had a mass/area of 15.1 g/m$^2$, a non-contact thickness of 130 microns, a porosity of 87.6%, a MD MTS of 69 MPa, and a TD MTS of 79 MPa.

Expanded Polytetrafluoroethylene Porous Membrane

The PTFE material is prepared using a fine powder PTFE blend as described in Example 1 of U.S. Pat. No. 5,814,405 to Branca and formed into a porous article using the general process methodology described in U.S. Pat. No. 3,953,566 to Gore, the teaching of which are incorporated herein in their entirety. The PTFE fine powder is lubed with Isopar K at a ratio of 140 cc/lb of lubricant to resin and mixed. The mixture is pelletized and extruded at 49° C. through a die with a reduction ratio of 100:1, producing an extruded tape with a thickness of 24 mil and a width of 12 inches. The tape is then calendered at a temperature of 50° C. to a thickness of 20 mil. It is then dried up to 300° C. to remove the lubricant and uniaxially expanded at 300° C. to a total ratio of 2.9:1 between a series of rollers. Finally, it is expanded across a 43 inch gap at 325° C. at a ratio of 8.8:1 and a speed of 24 fpm. The resulting article has a mass/area of 41 g/m$^2$, a thickness of 378 micron, a z-strength of 41.1 kPa (6 psi) and a matrix tensile strength of 18,300 psi in the longitudinal direction and 130 psi in the transverse direction.

Example 1

Figure 2:
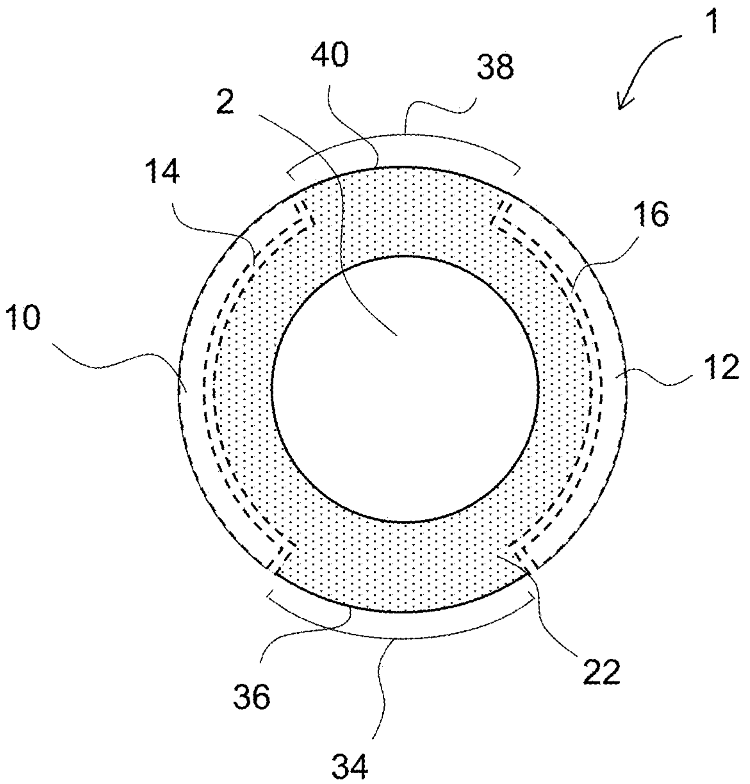
FIG. 2: A bottom-up cross-sectional view of a vent assembly according to an embodiment.
Figure 3:
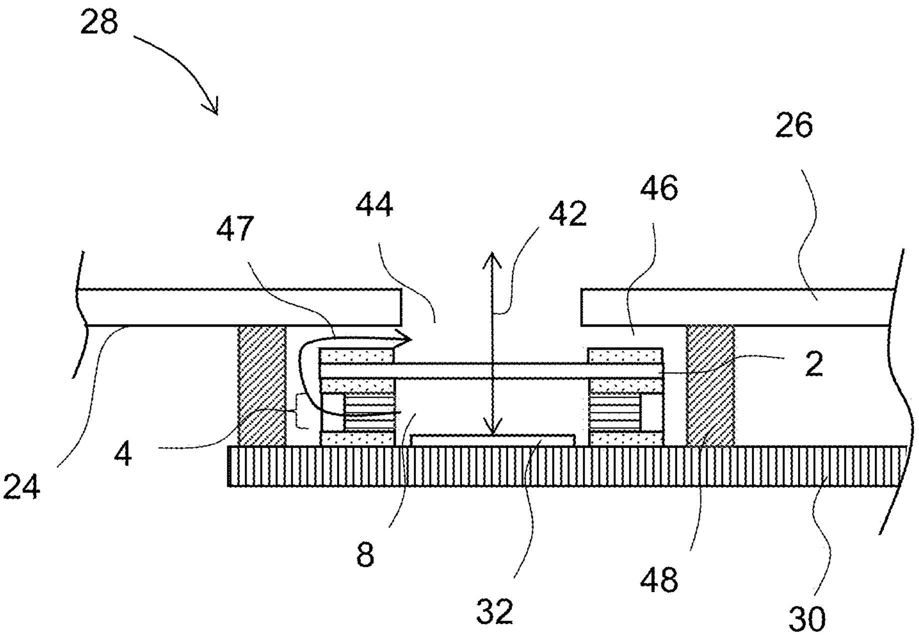
FIG. 3: A side view of a vent assembly according to an embodiment installed into an electronic device.

With reference to FIGS. 1-3, a vent assembly 1 (acting as an acoustic vent assembly) comprises an ultrahigh molecular weight polyethylene (PE) gel-processed nonporous membrane 2 (obtained from W. L. Gore & Associates, Inc., die cut to size, acting as a nonporous acoustic membrane) and a breathable element 4. The breathable element 4 comprises an expanded polyethylene (ePE) membrane 6 (made using the method provided above, die cut to shape, acting as a breathable material) defining an aperture 8, a first strengthening element 10 and a second strengthening element 12. The breathable element 4 has a thickness of 50 microns and the first strengthening element 10 is positioned on and spaced apart from a first side of the ePE membrane 6 such that a space 14 is formed and the second strengthening element 12 is positioned on and spaced apart from a second side of the ePE membrane 6 opposed to the first side such that a space 16 is formed. The first strengthening element 10 and the second strengthening element 12 comprise PET (obtained from Toray Advanced Composites UK under part number T60-toray PET #50).

The breathable element 4 is adhered to the nonporous PE membrane 2 by a layer of an acrylic pressure sensitive adhesive (PSA) 18 (sourced from Tesa SE under part number tesa 51972). Further PSA adhesive layers 20 (sourced from Tesa SE under part number tesa 51972) and 22 (sourced from Tesa SE under part number tesa 61865 SPT) are provided on the opposing side of the nonporous PE membrane 2 to the breathable element 4 to adhere the vent assembly 1 to the interior surface 24 of a housing 26 of an electronic device 28 and on the opposing side of the breathable element 4 to the nonporous PE membrane 2 to adhere the vent assembly 1 to a substrate 30 comprising a microphone 32 (acting as an acoustic transducer).

A first aperture 34 is formed between the first strengthening element 10 and the second strengthening element 12 on a third side 36 of the breathable element 4. A second aperture 38 is formed between the first strengthening element 10 and the second strengthening element 12 on a fourth side 40 of the breathable element 4. The third side 36 is on an opposed side of the breathable element 4 to the fourth side 40.

When installed within an electronic device 28 (FIG. 3) an acoustic pathway 42 is formed between the microphone 32 and the exterior of the electronic device 28 through the aperture 8, nonporous PE membrane 2 and an aperture 44 defined in housing 26.

A space 46 is formed between the adhesive layer 20 and the housing 26 to allow gas to flow from the aperture to the exterior of the electronic device via the ePE membrane 6 and the space 46 (see arrow 47 in FIG. 3 indicating the gas pathway). The vent assembly 1 is separated from the interior of the electronic device 28 by a wall 48.

Alternatively (not shown), a further breathable element may be provided between the housing and the membrane.

Example 2

Figure 4:
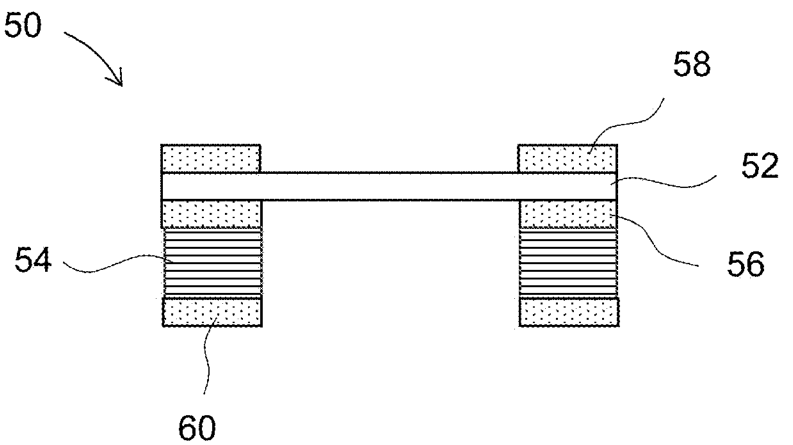
FIG. 4: A side view of a vent assembly.
Figure 5:
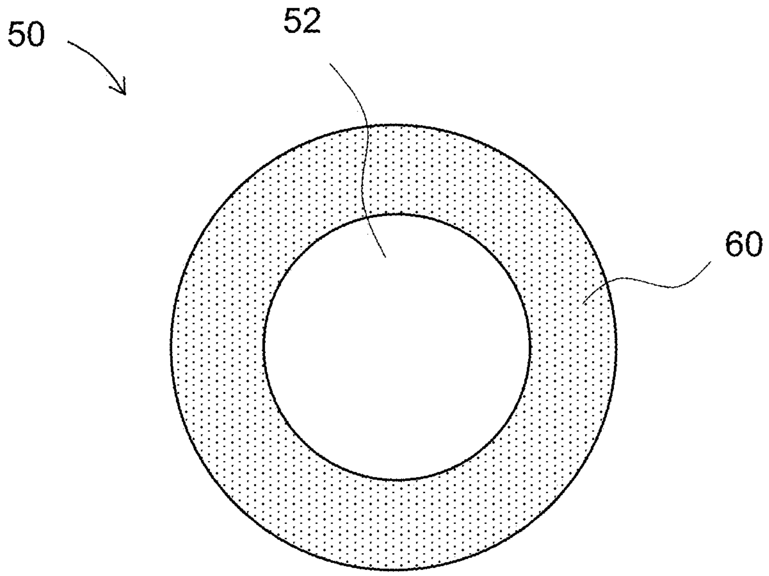
FIG. 5: A bottom-up view of a vent assembly.

With reference to FIGS. 4 and 5, a comparative vent assembly 50 comprises a nonporous polyethylene (PE) membrane 52 and a breathable element 54. The breathable element 54 comprises an expanded polyethylene (ePE) membrane and was measured to have a contact thickness of 60 μm. Nonporous PE membrane 52 and ePE membrane are as per Example 1.

The breathable element 54 is adhered to the nonporous PE membrane 52 by a layer of an acrylic PSA adhesive 56 (sourced from Tesa SE under part number tesa 51972). Further adhesive layers 58 (sourced from Tesa SE under part number tesa 51972) and 60 (sourced from Tesa SE under part number tesa 61865 SPT) are provided on the opposing side of the nonporous PE membrane 52 to the breathable element 54 to adhere the vent assembly 50 to the interior wall of a housing of an electronic device and on the opposing side of the breathable element 54 to the nonporous PE membrane 52 to adhere the vent assembly 50 to a substrate comprising a microphone.

Example 3

A further vent assembly was made according to example 1 except that the first strengthening element and the second strengthening element comprised polyimide (obtained from CEN New Materials Co. Ltd. under part number BY222).

Example 4

Figure 6:
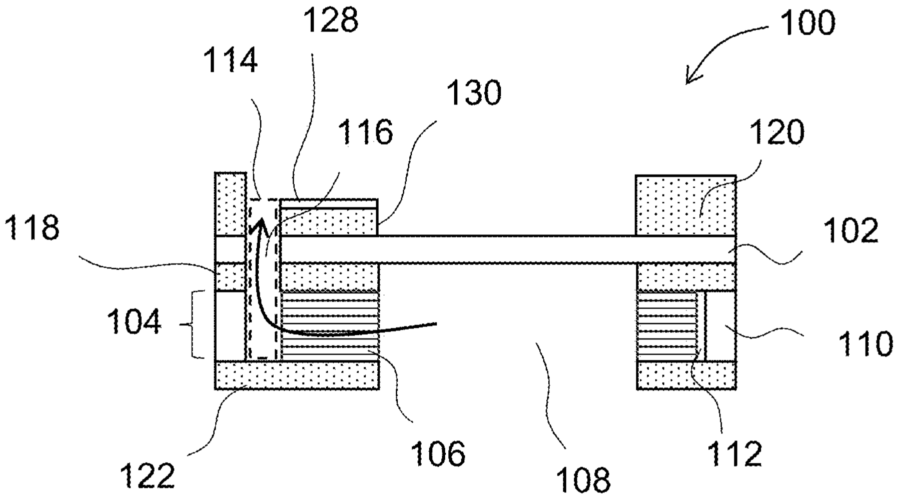
FIG. 6: A side cross-sectional view of a vent assembly according to an embodiment.
Figure 7:
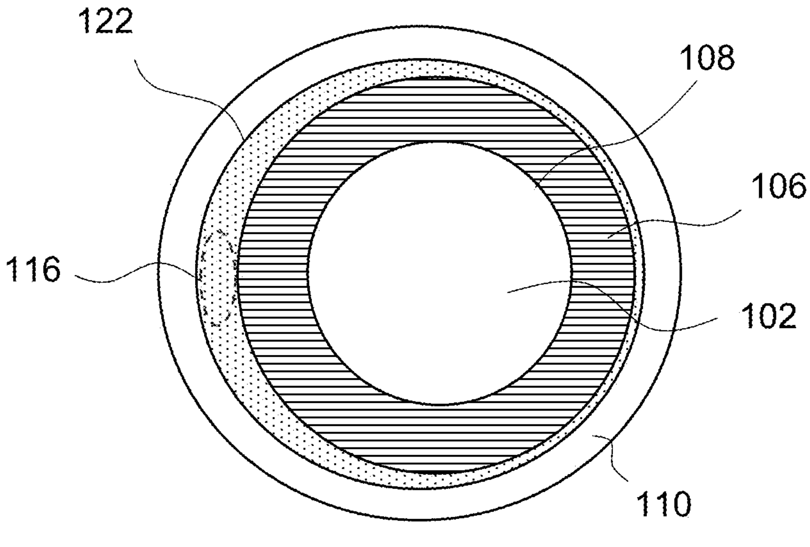
FIG. 7: A bottom-up cross-sectional view of a vent assembly according to an embodiment.
Figure 8:
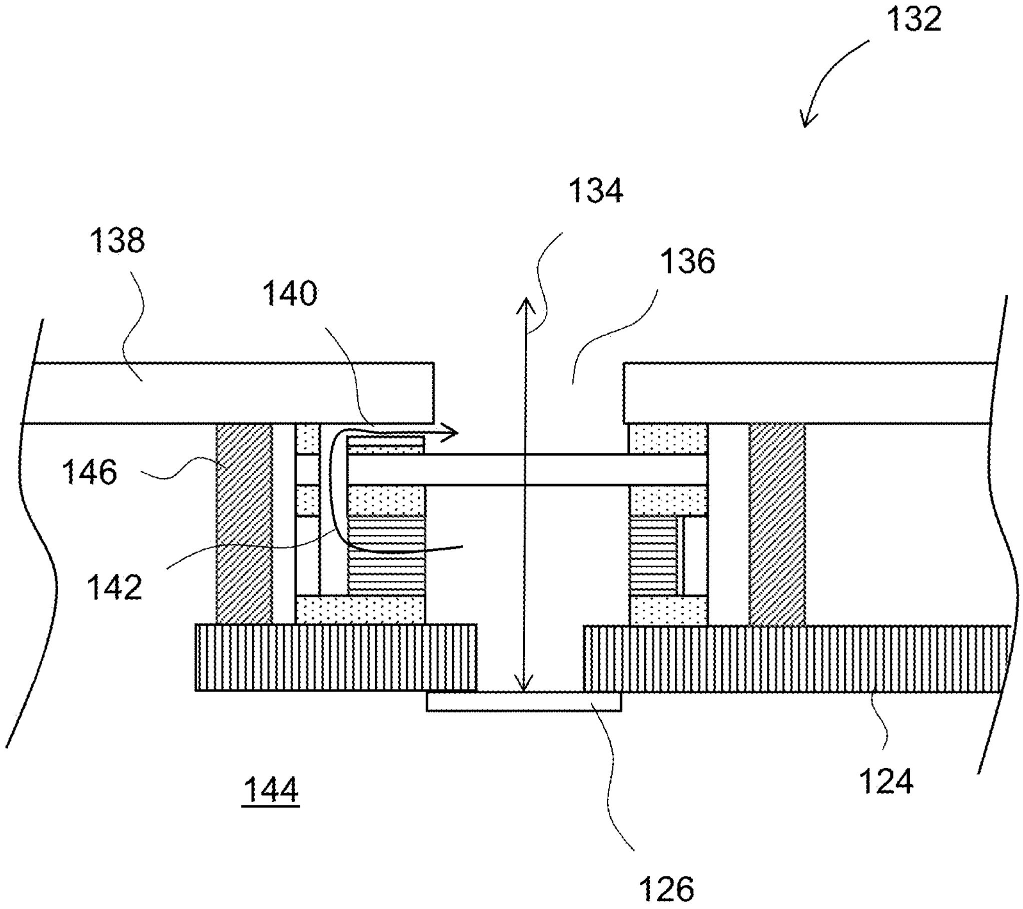
FIG. 8: A side view of a vent assembly according to an embodiment installed into an electronic device.

With reference to FIGS. 6 to 8, a vent assembly 100 (acting as an acoustic vent assembly) comprises an ultrahigh molecular weight polyethylene (PE) gel-processed nonporous membrane 102 (obtained from W. L. Gore & Associates, Inc., die cut to size, acting as a nonporous acoustic membrane) and a breathable element 104. The breathable element 104 comprises an expanded polyethylene (ePE) membrane 106 (prepared using the method provided above, die cut to shape, acting as a breathable material) defining an aperture 108, and a strengthening element 110. The breathable element 104 has a thickness of 50 microns and the strengthening element 110 is positioned on and spaced apart from the ePE membrane 106 such that a space 112 is formed. The strengthening element 110 comprise PET (obtained from Toray Advanced Composites UK under part number T60-toray PET #50). A vent channel 114 (indicated by the dashed box in FIG. 6) extends from the space 112 through an aperture 116 provided in the nonporous PE membrane 102.

The breathable element 104 is adhered to the nonporous PE membrane 102 by a layer of an acrylic pressure sensitive adhesive (PSA) 118 (sourced from Tesa SE under part number tesa 51972). Further PSA adhesive layers 120 (sourced from Tesa SE under part number tesa 51972) and 122 (sourced from Tesa SE under part number tesa 61865 SPT) are provided on the opposing side of the nonporous PE membrane 102 to the breathable element 104 to adhere the vent assembly 100 to the interior surface of a housing of an electronic device and on the opposing side of the breathable element 104 to the nonporous PE membrane 102 to adhere the vent assembly 100 to a substrate 124 comprising a speaker 126 (acting as an acoustic transducer). A layer of PET 128 is provided on the portion 130 of the adhesive layer 120 adjacent to the vent channel 114.

When installed within an electronic device 132 an acoustic pathway 134 is formed between the speaker 126 and the exterior of the electronic device 132 through the aperture 108, nonporous PE membrane 102 and an aperture 136 defined in housing 138.

A space 140 is provided in the adhesive layer 120 to allow gas to pass 142 between the aperture 108 adjacent to the speaker 126 and the exterior of the electronic device 132 via the vent channel 124.

The vent assembly 100 is separated from the interior 144 of the electronic device 132 by a wall 146.

Example 5

A further vent assembly according to Example 1 comprises a breathable element comprising a porous expanded polytetrafluoroethylene (ePTFE) membrane made using the method described above rather than an ePE membrane.

Example 6

A further vent assembly according to Example 2 comprises a breathable element comprising a porous expanded polytetrafluoroethylene (ePTFE) membrane made using the method described above rather than an ePE membrane.

Example 7

A further vent assembly according to Example 1 comprises a breathable element comprising a commercially available porous polyimide (PI) membrane rather than an ePE membrane. The porous PI membrane had a porosity of 70%, a contact thickness of 25 μm and a z-strength of 0.25 MPa using the ZWICK 170 load as described above.

Example 8

A further vent assembly according to Example 2 comprises a breathable element comprising the porous polyimide (PI) membrane of Example 7 rather than an ePE membrane.

Examples 9-11

Further vent assemblies according to Example 1, where the the percentage of the outer surface of the breathable element that is formed by the strengthening element/s. Example 9 comprised a single strengthening element. Examples 10 and 11 comprised a first strengthening element and a second strengthening element.

TABLE 2

Example Vent assemblies

| Example | Membrane | Breathable Element |
|---|---|---|
| 1 | ePE (nonporous) | ePE (porous) + 2× PET SE |
| 2 | ePE (nonporous) | ePE (porous) |
| 3 | ePE (nonporous) | ePE (porous) + 2× PI SE |
| 4 | ePE (nonporous) | ePE (porous) + 1× PET SE + vent channel |
| 5 | ePE (nonporous) | ePTFE (porous) + 2× PET SE |
| 6 | ePE (nonporous) | ePTFE (porous) |
| 7 | ePE (nonporous) | PI (porous) + 2× PET SE |
| 8 | ePE (nonporous) | PI (porous) |
| 9 | ePE (nonporous) | ePE (porous) + 1× PET SE |
| 10 | ePE (nonporous) | ePE (porous) + 2× PET SE |
| 11 | ePE (nonporous) | ePE (porous) + 2× PET SE |

SE = strengthening element

Examples 2, 6 and 8 are comparative examples and do not include strengthening elements.

The airflow and Peel Force of the vent assemblies of Examples 1-11 were measured and the results are shown in Table 3 below.

TABLE 3

Airflow and Peel force of example vent assemblies

| Example | Airflow (mean)/ mL/min | Airflow (std)/ mL/min | Peel Force (mean)/N | Peel Force (std)/N | Perimeter ratio (SE OD/total OD)/% |
|---|---|---|---|---|---|
| 1 | 15.11 | 2.11 | 1.24 | 0.18 | 68 |
| 2 | 81.47 | 23.72 | 0.81 | 0.05 | 0 |
| 3 | 9.6 | 1.8 | 1.41 | 0.16 | 68 |

TABLE 3-continued

Airflow and Peel force of example vent assemblies

| Example | Airflow (mean)/ mL/min | Airflow (std)/ mL/min | Peel Force (mean)/N | Peel Force (std)/N | Perimeter ratio (SE OD/total OD)/% |
|---|---|---|---|---|---|
| 4 | 25.49 | 2.16 | 0.52 | 0.08 | 100 |
| 5 | 7.36 | 2.23 | 1.09 | 0.12 | 68 |
| 6 | 3.94 | 7.11 | 0.22 | 0.02 | 68 |
| 7 | 2.05 | 1.37 | 1.36 | 0.09 | 68 |
| 8 | 13.80 | 3.07 | 0.22 | 0.08 | 0 |
| 9 | 10.7 | 1.9 | 1.61 | 0.18 | 90 |
| 10 | 17.7 | 4.7 | 0.97 | 0.08 | 40 |
| 11 | 26.6 | 9.2 | 0.95 | 0.06 | 20 |

As can be seen in Table 3, Example 1 that includes 2 PET strengthening elements has a reduced airflow when compared to Example 2 (that does not have any strengthening elements) but a greatly improved consistency of airflow as shown by the reduction in standard deviation (std) of the airflow for Example 1 compared to Example 2. Furthermore, Example 1 has an improved mean peel force when compared to Example 2, showing that the provision of strengthening elements improves a vent assembly's resistance to delamination.

Example 3, that includes 2 PI strengthening elements, also shows a reduced airflow with greater consistency than Example 2, whilst also having improved peel force.

Examples 1 and 9-11 show that as the size of the strengthening elements is reduced (i.e. the % of the outer surface of the breathable layer is reduced) the airflow through the breathable material of the breathable layer increases whilst the resistance to delamination of the vent assembly is reduced. Accordingly, the size of the strengthening elements can be tailored to the requirements of a given vent assembly and application.

Example 4 shows that the provision of a vent channel in the vent assembly improves the airflow through the vent assembly.

In addition, it has been found that vent assemblies according to Example 4 pass delamination tests (20/20) whilst in comparison vent assemblies of Example 2 failed delamination tests (0/20) using the delamination test provided above.

While there has been hereinbefore described approved embodiments of the present invention, it will be readily apparent that many and various changes and modifications in form, design, structure and arrangement of parts may be made for other embodiments without departing from the invention and it will be understood that all such changes and modifications are contemplated as embodiments as a part of the present invention as defined in the appended claims.

The invention claimed is:

1. An acoustic vent assembly comprising a nonporous acoustic membrane, and a breathable element, the breathable element defining an aperture and an acoustic pathway extends from a first side of the acoustic vent assembly to a second side of the acoustic vent assembly through the aperture and the nonporous acoustic membrane, the breathable element configured to be positioned between the nonporous acoustic membrane and an acoustic transducer when the acoustic vent assembly is installed in an acoustic device comprising the acoustic transducer, wherein an airflow through the breathable element is at least 5 mL/min at 7 kPa, wherein the breathable element comprises a breathable material and a strengthening element, wherein the strengthening element has a z-strength from 200 N to 10 MN and the breathable material has a z-strength from 0.3 to 100 N, the breathable material having an inner surface defining the aperture and an outer surface, the strengthening element being positioned on or directly adjacent to at least a portion of the outer surface of the breathable material such that the strengthening element forms from 20% to 95% of the outer surface of the breathable element.

2. The acoustic vent assembly of claim 1, wherein the airflow through the breathable element is from 10 to 500 mL/min at 7 kPa.

3. The acoustic vent assembly of claim 1, wherein the strengthening element has the same depth as the breathable material in the breathable element.

4. The acoustic vent assembly of claim 1, wherein the strengthening element forms from 50% to 95% of the outer surface of the breathable element.

5. The acoustic vent assembly of claim 1, wherein the strengthening element comprises polyethylene terephthalate (PET) or polyimide (PI).

6. The acoustic vent assembly of claim 1, wherein the breathable element comprises at least one opening defined by the strengthening element such that the breathable material of the breathable element is exposed through or extends through the at least one opening.

7. The acoustic vent assembly of claim 1, wherein the breathable material comprises a polymer selected from polyethylene (PE), polypropylene (PP), Parylene C, Parylene N, polyphenylene sulfide (PPS), polyethylene napthalate (PEN), polyamide, polysulfones (PSU), polyethersulfones (PES), polyacrylonitrile (PAN), polyurethane, polyimide (PI), polydimethylsiloxane (PDMS), polyester, or a fluoropolymer.

8. The acoustic vent assembly of claim 7, wherein the breathable material comprises PE, PI or polytetrafluoroethylene (PTFE).

9. The acoustic vent assembly of claim 1, wherein the strengthening element is a first strengthening element and further comprising a second strengthening element, wherein the first strengthening element is positioned on a first side of the breathable material and the second strengthening element positioned on an opposed second side of the breathable material.

10. The acoustic vent assembly of claim 9, wherein a first opening is defined between the first strengthening element and the second strengthening element on a first side of the breathable element and a second opening is defined between the first strengthening element and the second strengthening element on a second side of the breathable element.

11. The acoustic vent assembly of claim 1, wherein the acoustic vent assembly further comprises a vent channel separated from the acoustic pathway by the breathable material of the breathable element that extends from the breathable element through the nonporous acoustic membrane.

12. An acoustic device comprising a housing defining an acoustic aperture and an enclosed internal volume, an acoustic substrate comprising the acoustic transducer and the acoustic vent assembly according to claim 1 spanning the acoustic aperture, wherein an acoustic volume is defined between the nonpermeable acoustic membrane and the acoustic transducer and the acoustic pathway of the acoustic vent assembly extending from the acoustic transducer to the acoustic aperture through the nonpermeable acoustic membrane, wherein the breathable element of the acoustic vent assembly is configured to allow pressure equilibration between the acoustic volume and the enclosed internal volume of the housing.

13. The acoustic device of claim 12, wherein the acoustic transducer is a microphone or speaker.

14. An acoustic vent assembly comprising a nonporous acoustic membrane, and a breathable element, the breathable element defining an aperture and an acoustic pathway extends from a first side of the acoustic vent assembly to a second side of the acoustic vent assembly through the aperture and the nonporous acoustic membrane, the breathable element configured to be positioned between the nonporous acoustic membrane and an acoustic transducer when the acoustic vent assembly is installed in an acoustic device comprising the acoustic transducer, wherein an airflow through the breathable element is at least 5 mL/min at 7 kPa, wherein the breathable element comprises a breathable material and a strengthening element, the breathable material having an inner surface defining the aperture and an outer surface, the strengthening element being positioned on or directly adjacent to at least a portion of the outer surface of the breathable material such that the strengthening element surrounds the breathable material, wherein the acoustic vent assembly further comprises a vent channel separated from the acoustic pathway by the breathable material of the breathable element that extends from the breathable element through the nonporous acoustic membrane.

15. An acoustic device comprising a housing defining an acoustic aperture and an enclosed internal volume, an acoustic substrate comprising an acoustic transducer and an acoustic vent assembly according to claim 14 spanning the acoustic aperture, wherein an acoustic volume is defined between the nonpermeable acoustic membrane and the acoustic transducer and the acoustic pathway of the acoustic vent assembly extending from the acoustic transducer to the acoustic aperture through the nonpermeable acoustic membrane, wherein the breathable element of the acoustic vent assembly is configured to allow pressure equilibration between the acoustic volume and the enclosed internal volume of the housing.

16. The acoustic device of claim 15, wherein the acoustic transducer is a microphone or speaker.

* * * * *